March 4, 1952 — F. A. FORERO — 2,588,102
LIQUID LEVEL SIGNALING APPARATUS
Filed Oct. 22, 1948 — 2 SHEETS—SHEET 1
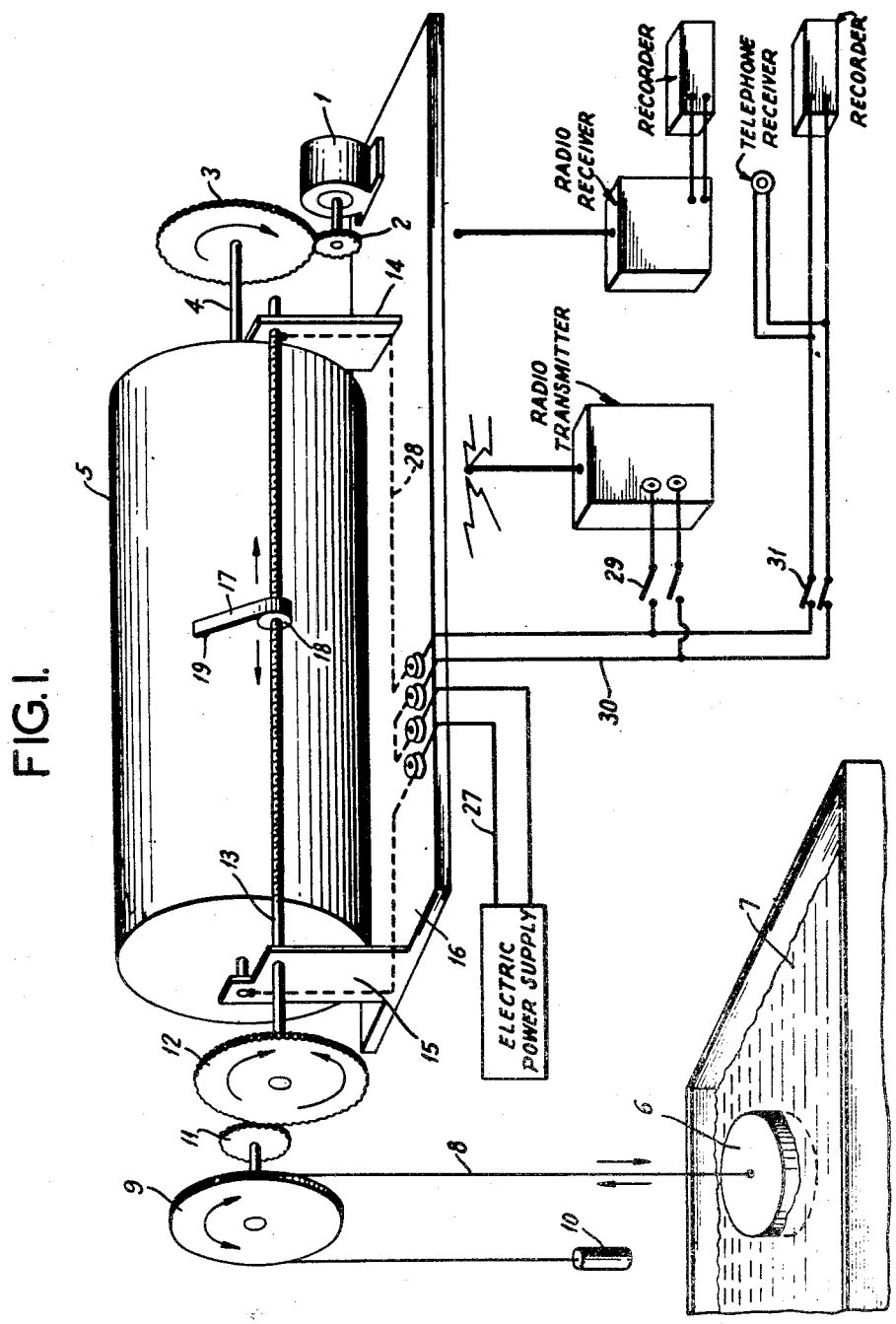
FIG. I.
INVENTOR
FRANCISCO A. FORERO
ATTORNEY March 4, 1952 F. A. FORERO 2,588,102
LIQUID LEVEL SIGNALING APPARATUS
Filed Oct. 22, 1948 2 SHEETS—SHEET 2
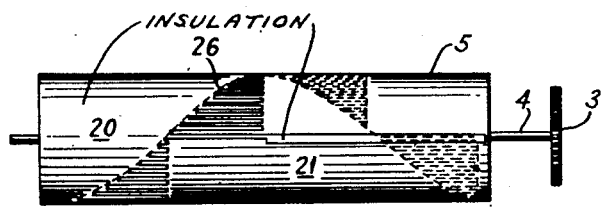
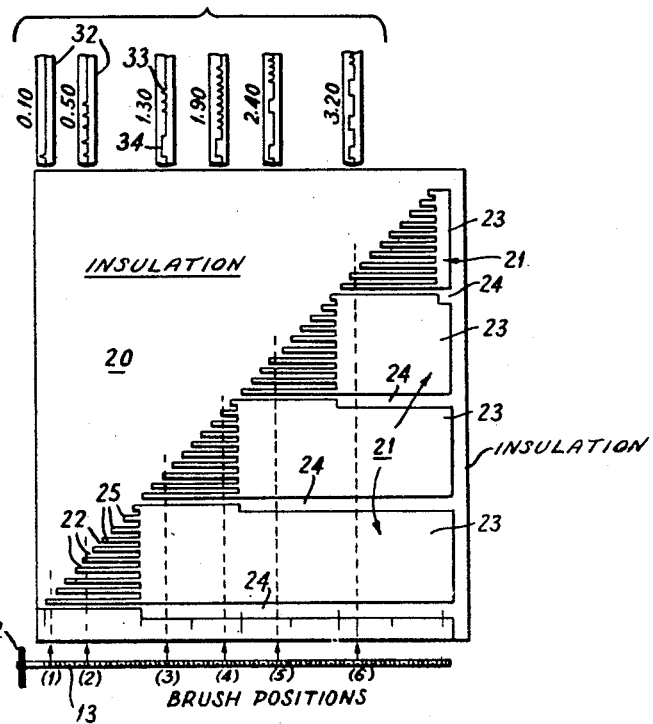
INVENTOR
FRANCISCO A. FORERO
BY
ATTORNEY Patented Mar. 4, 1952

2,588,102

UNITED STATES PATENT OFFICE 2,588,102

LIQUID LEVEL SIGNALING APPARATUS

Francisco A. Forero, Bogota, Colombia

Application October 22, 1948, Serial No. 55,897

1 Claim. (Cl. 177—351)

This invention relates to a device for signaling the level of a liquid and more particularly to a device for sending signals to remote stations to indicate the existing level of the liquid.

I am aware of the fact that numerous devices have been proposed for reporting the level of liquids in storage tanks, harbors, rivers, reservoirs, etc., as well as the operation of instruments such as thermometers. However, all the devices with which I am familiar are complicated, expensive and require close supervision and skilled operators to keep them in running condition.

My invention comprises simply a rotating cylinder whose surface is laid out into electrically conducting and insulating portions that cooperate with a contact brush that is moved along the surface of the cylinder. The brush is moved according to the movement of a float in the liquid whose height it is desired to know. Depending on the point at which the brush contacts the cylinder, different impulses will be transmitted to indicate the height of the liquid. These impulses may be transmitted in a number of ways, e. g. radio, telegraph, etc. At remote stations the impulses will be received and transcribed on a tape to provide a permanent record of the variations in height of the liquid.

Accordingly, the object of my invention is to provide a device which is simple and inexpensive to build as well as to operate, and which will be rugged and able to function accurately under most operating conditions.

A feature of the invention is that I provide means whereby the level of a liquid will be continuously reported to remote stations so that at any time this information will be available.

Another feature of the invention is that the continuous report may be in the form of a radio, telegraph or telephone signal which is permanently recorded in a suitable manner.

Still another feature of the invention is the novel cylinder I provide whereby a simple code is transmitted that accurately indicates the variations in the height of the liquid.

A more complete understanding of my invention will be obtained from the following detailed description taken in connection with the drawings, in which:

Fig. 1 is a perspective view of the device which does not show the detailed layout of the cylinder;

Fig. 2 is a side elevation of the cylinder; and

Fig. 3 shows the surface of the cylinder unrolled and Fig. 4 shows recordings on pieces of the tape.

A driving means such as electric motor 1 is suitably connected by gears 2, 3 to axle 4 of a hollow metal cylinder 5. Motor 1 rotates cylinder 5 at a constant rate of speed, for example, 20 R. P. M.

A float 6 rests in liquid 7 and is attached to one end of a rope 8 which passes around wheel 9 and has a counterweight 10 tied to the other end. Wheel 9 is connected to suitable gears 11, 12. Gear 12 rotates a screw threaded shaft 13 which, along with axle 4, is supported in uprights 14, 15, projecting from base 16. A metal brush 17 engages shaft 13 by a screw threaded mounting 18 and contact making portion 19 on the free end of the brush rests against the surface of cylinder 5.

Referring to Figs. 2 and 3 and particularly Fig. 3, the surface of cylinder 5 is roughly divided in half into an insulating zone 20 and a conducting zone 21. Conveniently, since cylinder 5 is metal, the portions of it which are to be insulating are covered by suitable insulating material such as hard rubber or plastic. The main body of zone 20 is a triangularly shaped segment having a plurality of projections 22 projecting into relatively wide conducting bands 23 that comprise conducting zone 21. Zones 20 and 21 contact each other along one edge by means of meshing strips 22 and 25. Bands 23 are of equal width and separated from one another by insulating strips 24. Starting from the bottom of Fig. 3, bands 23 are of progressively shorter length. The same number of insulating strips 22 project to the same depth into each band 23, thereby forming an equal number of conducting strips 25. These strips (22 and 25), in each band, beginning at the bottom of Fig. 3, are of progressively shorter length. Since the bands are of decreasing length, a stairway effect will be produced by conducting strips 25 and a straight line drawn through the upper left hand edges of strips 25 will describe helix 26 (Fig. 2) on the surface of the cylinder.

According to Fig. 3 the surface of cylinder 5 has been laid out to signal movements in the liquid of from one tenth of a foot to four feet. Each band 23 represents a foot and each strip 25 a tenth of a foot. Obviously, the surface of the cylinder could be divided according to other units of measurement whereby greater or less amounts of rise and fall would be signaled.

Current from a suitable electric power supply is transmitted to axle 4 over conductor 27 and a circuit may be traced which will include axle 4, conducting portions of cylinder 5, contact 19, brush 17, shaft 13, conductor 8, closed switch 29, radio transmitter and back to the source over conductor 30. The signals from the transmitter will be received at a remote station by a suitably tuned receiver which will transmit them in one of the well-known manners to a recorder that will record the signals on a tape. If switch 31 is closed the signals will be telegraphically transmitted to a recorder and/or a telephone receiver.

Referring to Fig. 4, 32 are pieces of tape that have been detached, for the purposes of illustration, from the roll of tape (not shown) in the recorder on which the transmitted signals are inscribed. The tape is moved in a suitable manner in front of a stylus (not shown) in the recorder which normally marks a continuous line on the tape except when, depending on the position of contact brush 17 along the length of cylinder 5, a pip 33 or a step 34 are marked on tape 32. The pips indicate tenths and the steps feet. For instance, in position 3 of the brush the tape will record the level of the liquid as being 1.30 feet above a known level.

The operation of the device will now be explained assuming that float 6 is in a body of water and the tide is rising. The device has been adjusted so that at dead low tide no signal is transmitted and the recorder consequently inscribes only a straight line on the tape.

Power is applied to motor 1 and cylinder 5 is rotated. The power supply, radio transmitter, receiver and recorder are turned on and switch 29 closed. As float 6 rises wheel 9 is turned counterclockwise and this movement is transmitted via gears 11, 12 to screw threaded shaft 13 which moves contact brush 17 by means of mounting 18 along the surface of cylinder 5. Each time brush 17 contacts the bare surface or contact zone 21 of the cylinder, the electrical circuit above described will be closed and a pulse transmitted. As the brush moves from the left hand end of the cylinder to the right, signals will be transmitted depending on the position of the brush along cylinder 5. The first signal transmitted will be 0.10 and then as the tide rises 0.20 etc. Since the movement of the tide is gradual the same signal will be repeatedly sent and anyone at a receiving station familiar with the code will be able readily to determine the stage of the tide.

The device may be run intermittently or continuously so that at any time a remote station can tune in and find out the height of water at a given point. A number of these devices may be placed, for instance, at different points along a navigable river. Each transmitting station will be given an identifying signal which is periodically sent out, and a person at a receiving station will be able to know with certainty the height of water and its rate of change at a particular point so that he may, for example, plan shipping movements.

It will be appreciated that by varying the size of the cylinder there will be more or less surface available for division into measuring units. Thus, if a cylinder were used having twice the diameter of the one shown in the drawings and the same unit of measure used, it could report the level of water from a twentieth of a foot to eight feet. It would also be possible to provide two or more cylinders of different sizes instead of one, the largest cylinder for signaling movements in feet and the smaller ones movements of less than a foot.

Thus, it will be seen that my device is free of the usual complications associated with such devices and that it transmits a simple and reliable signal. Since the signal consists of nothing more than dashes and dots it lends itself readily to any number of types of comunication equipment from the most complex to the most rudimentary.

Although my invention is particularly useful in the reporting of tide conditions in harbors and rivers, it is also applicable in many other situations where it is desired to know the height of a liquid, e. g. oil storage tanks, reservoirs, lakes, dams, etc.

While I have shown preferred embodiments of my device it is to be understood that other embodiments and variations will be suggested to those skilled in the art by the foregoing and I intend to limit my invention only by what is set forth in the appended claim.

What is claimed is:

In a device for signaling the level of a liquid, a transmitter cylinder, a single contact brush electrically cooperating with the cylinder, the surface of said cylinder being divided substantially in two, one-half comprising an insulating zone and the other half a conducting zone, said zones lying on the surface of the cylinder, the main body of the conducting zone comprising a plurality of relatively wide bands of conducting material and the main body of the insulating zone comprising a triangularly-shaped area of insulating material, said bands of conducting material being of equal width but of progressively shorter length, first strips of insulating material extending from said insulating zone and separating said bands from one another, and a plurality of second strips of insulating material projecting from said insulating zone into each of said bands, the number of said second strips and the depth to which they penetrate being the same for all said bands.

FRANCISCO A. FORERO.

REFERENCES CITED

The following references are of record in the file of this patent:

UNITED STATES PATENTS

| Number | Name | Date |
|---|---|---|
| 515,110 | Callender | Feb. 20, 1894 |
| 546,228 | Davis | Sept. 10, 1895 |
| 1,505,031 | King | Aug. 12, 1924 |
| 2,082,697 | Ingerson | June 1, 1937 |
| 2,207,769 | White | July 16, 1940 |
| 2,247,942 | Koevend | July 1, 1941 |
| 2,371,415 | Tolson | Mar. 13, 1945 |

FOREIGN PATENTS

| Number | Country | Date |
|---|---|---|
| 134,018 | Great Britain | Oct. 22, 1919 |